United States Patent
Jeon

(10) Patent No.: US 9,525,363 B2
(45) Date of Patent: Dec. 20, 2016

(54) METHOD FOR VOLTAGE DIP COMPENSATION OF INVERTER

(71) Applicant: LSIS CO., LTD., Anyang-si, Gyeonggi-do (KR)

(72) Inventor: Jae Hyun Jeon, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 45 days.

(21) Appl. No.: 14/734,965

(22) Filed: Jun. 9, 2015

(65) Prior Publication Data

US 2015/0357936 A1 Dec. 10, 2015

(30) Foreign Application Priority Data

Jun. 10, 2014 (KR) .................. 10-2014-0069845

(51) Int. Cl.
*H02M 7/53* (2006.01)
*H02M 7/537* (2006.01)
(Continued)

(52) U.S. Cl.
CPC .............. *H02M 7/537* (2013.01); *H02M 1/32* (2013.01); *H02M 7/49* (2013.01); *H02M 2001/325* (2013.01)

(58) Field of Classification Search
CPC ............ H02M 1/32; H02M 1/36; H02M 7/42; H02M 7/49; H02M 7/537; H02M 2001/325
See application file for complete search history.

(56) References Cited

U.S. PATENT DOCUMENTS

| 5,670,833 A * | 9/1997 | Mengelt | H02J 9/06 |
| | | | 307/64 |
| 7,212,414 B2 * | 5/2007 | Baarman | A61L 2/10 |
| | | | 363/16 |

(Continued)

FOREIGN PATENT DOCUMENTS

| EP | 2549637 | 1/2013 |
| JP | 62-210891 | 9/1987 |

(Continued)

OTHER PUBLICATIONS

European Patent Office Application Serial No. 151702032, Search Report dated Nov. 5, 2015, 7 pages.

(Continued)

*Primary Examiner* — Matthew Nguyen
(74) *Attorney, Agent, or Firm* — Lee, Hong, Degerman, Kang & Waimey PC

(57) ABSTRACT

Disclosed is a method for voltage dip compensation of inverter, the method including reducing an output frequency of an inverter to obtain a regenerative energy when it is determined that power failure has occurred during the inverter operation, adjusting increase/decrease of inverter output frequency in response to size of exceeding current and voltage based on an output current and DC-link voltage of the inverter, increasing the inverter output frequency in order to prevent excessive current flow when power restoration occurs at a power failure state, and returning to a speed prior to the momentary voltage dip by gradually increasing the inverter output frequency in a state where the inverter output frequency does not exceed an over-current limit by monitoring the inverter output frequency.

9 Claims, 6 Drawing Sheets

(51) Int. Cl.
*H02M 1/32* (2007.01)
*H02M 7/49* (2007.01)

(56) References Cited

U.S. PATENT DOCUMENTS

| 2011/0101790 A1* | 5/2011 | Budgett | A61M 1/127 |
| | | | 307/104 |
| 2016/0134219 A1* | 5/2016 | Kim | H02P 23/14 |
| | | | 318/812 |

FOREIGN PATENT DOCUMENTS

| JP | 2004-104959 | 4/2004 |
| JP | 2013-27310 | 2/2013 |
| JP | 2013-74792 | 4/2013 |

OTHER PUBLICATIONS

Japan Patent Office Application Serial No. 2015-116698, Office Action dated Apr. 26, 2016, 2 pages.

* cited by examiner

METHOD FOR VOLTAGE DIP COMPENSATION OF INVERTER

Pursuant to 35 U.S.C. §119(a), this application claims the benefit of earlier filing date and right of priority to Korean Patent Application No. 10-2014-0069845, filed on Jun. 10, 2014, the contents of which are all hereby incorporated by reference herein in its entirety.

TECHNICAL FIELD

The present disclosure relates to a method for voltage dip compensation of inverter, and more particularly to a method for voltage dip compensation of inverter applicable to a CHB type medium voltage inverter.

BACKGROUND ART

An inverter stops a PWM (Pulse Width Modulation) output within several ms when a power failure occurs in an inputted power source. At this time, it takes a long time to accelerate a load at the time of power restoration when the load has a great inertia, which may cause a great loss to industrial sites, such that a voltage dip or sag compensation technology for an inverter is applied to where a serious damage is expected by process failure when the inverter is stopped.

FIGS. 1a and 1b are schematic views illustrating a momentary voltage dip compensating operation in a conventional inverter, where FIG. 1a illustrates a case of normal state, while FIG. 1b illustrates a case where a power interruption is generated.

Referring to FIGS. 1a and 1b, an electrolytic condenser (210, illustrated outside of an inverter for convenience of explanation) embedded in an inverter (200) is normally charged with a power (100) from the inverter during a normal state (FIG. 1a), but drives a load (300) using the power charged in the electrolytic condenser (210) when the power is interrupted during power failure (FIG. 1b).

At this time, the conventional electrolytic condenser (210) is so designed as to secure 16 ms for a momentary voltage dip time, and when the momentary voltage dip time is within the 16 ms, the inverter (200) can drive the load (300) without stoppage. However, in view of the fact that the inverter (200) is designed to cope with the momentary voltage dip within the 16 ms, an irregular power supply area may be generated with a power failure for more than 16 ms, resulting in creation of problems in inverter stoppage and thereby leading to a great damage to industrial sites.

Meantime, current trends are that demands for energy saving and for medium voltage inverters as well are increasing, and Cascade H-Bridge (CHB) type inverters are largely used for the medium voltage inverters. Reliability is important for CHB type inverters because the CHB type inverters are mainly installed on important facilities in the industrial sites.

However, the voltage dip compensation method in the conventional inverter as illustrated in FIG. 1a has a problem that cannot overcome the momentary power failure if applied to the CHB type medium voltage inverters, the reasons of which may be as follows:

First, the conventional momentary voltage dip compensation method cannot control a DC link of a plurality of unit power cells of a medium voltage inverter; Second, in the conventional momentary voltage dip compensation method using a feed-backed reference voltage as a voltage command of DC link, when the method is actually applied to a medium voltage inverter, the DC link voltage of each power cell cannot be driven as one voltage command due to parasitic components possessed by a capacitor; and Lastly, the conventional momentary voltage dip compensation method has failed to provide a solution in consideration of external environment of a large load mounted on CHB type medium voltage inverters. The conventional momentary voltage dip compensation method is fraught with a disadvantage of finding a deceleration gradient that generates power source regeneration. The conventional momentary voltage dip compensation method is such that a deceleration time that generates regeneration must be found in advance by changing the deceleration time during a normal operation, and there is a possibility of generating a trip instead of normal operation due to lack of regeneration amount, when the deceleration time that generates the regeneration is within 10 sec.

DISCLOSURE

Technical Problem

The present disclosure has been made to solve the foregoing disadvantages/problems of the prior art and therefore an object of certain embodiments of the present invention is to provide a method for voltage dip compensation of inverter.

Technical problems to be solved by the present disclosure are not restricted to the above-mentioned, and any other technical problems not mentioned so far will be clearly appreciated from the following description by skilled in the art.

Technical Solution

In one general aspect of the present disclosure, there is provided a method for voltage dip compensation of inverter, the method comprising:

reducing an output frequency of an inverter to obtain a regenerative energy when it is determined that power failure has occurred during the inverter operation;

adjusting increase/decrease of inverter output frequency in response to size of exceeding current and voltage based on an output current and DC-link voltage of the inverter;

increasing the inverter output frequency in order to prevent excessive current flow when power restoration occurs at a power failure state; and returning to a speed prior to the momentary voltage dip by gradually increasing the inverter output frequency in a state where the inverter output frequency does not exceed an over-current limit by monitoring the inverter output frequency.

Preferably, but not necessarily, the method for voltage dip compensation of inverter may further comprise: performing a momentary voltage dip test for grasping a load characteristic of a load installed at a field site with a basic set point to cope with a momentary voltage dip; determining whether a relevant load is a load that requires an additional current control in response to the grasped load characteristic;

setting the relevant load as a current control subject when it is determined that the relevant load is the current control subject as a result of determination, and setting the relevant load as not a current control subject when it is determined that the relevant load is not the current control subject as a result of determination;

setting to perform a momentary voltage dip compensation using voltage and current control on a relevant inverter when a momentary power failure occurs to a load set as the current control subject during inverter operation;

Preferably, but not necessarily, the step of determining whether the relevant load is a load that requires an additional current control in response to the grasped load characteristic may further include determining that a current control is additionally required when the load characteristic is not equal to a normalized load characteristic.

Preferably, but not necessarily, the step of setting to perform the momentary voltage dip compensation may include setting to perform a momentary voltage dip compensation by controlling the inverter output frequency in response to current change using a set deceleration gradient while checking an output current in addition to checking a DC-link voltage of a load set for the current control subject when a power failure occurs.

Preferably, but not necessarily, the step of setting to perform a momentary voltage dip compensation may include setting to perform a momentary voltage dip compensation by controlling the inverter output frequency in response to voltage change using a set deceleration gradient while checking a DC-link voltage of a load not set for the current control subject when a power failure occurs.

Preferably, but not necessarily, the step of adjusting increase/decrease of inverter output frequency may include controlling adjustment of increase/decrease of the inverter output frequency for momentary voltage dip compensation in response to an output current change and DC-link voltage change using a set deceleration gradient while checking an inverter output current and DC-link voltage.

Preferably, but not necessarily, the step of adjusting increase/decrease of inverter output frequency may include controlling adjustment of increase/decrease of the inverter output frequency for momentary voltage dip compensation in response to a voltage change using a set deceleration gradient while checking a DC-link voltage of the inverter.

Preferably, but not necessarily, the step of returning to the speed prior to the momentary voltage dip may include maintaining an output frequency at the time of power restoration for a predetermined time lest the inverter output current should exceed a predetermined over-current limit.

Preferably, but not necessarily, a time for maintaining the output frequency may be set by being determined in advance in response to a load amount of the load.

Preferably, but not necessarily, a time for maintaining the output frequency may be determined to maintain an output frequency so that a load speed becomes smaller than an output frequency of the inverter.

Advantageous Effects

The exemplary embodiments of the present disclosure has an advantageous effect in that a continuous operation is enabled by preventing generation of low voltage trip and overvoltage trip through enablement of adequate countermeasure to where load characteristics are respectively different and hysteresis characteristics are different in actual industrial sites by adjusting an inverter output frequency while an inverter output current and a DC-link voltage are kept within a limited scope at the time of (momentary) voltage dip.

Another advantageous effect is that an over-current trip due to excessive generation of slip can be prevented at the time of power restoration by maintaining an inverter output frequency for a predetermined time in a state where an excessive current does not flow by increasing an inverter output voltage while preventing an excessive current from flowing by increasing the inverter output voltage when an input voltage is restored.

BEST MODE

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

That is, definitions of the terms "include" and "comprise," as well as derivatives thereof, may mean inclusion without limitation. In the definitions, the power failure and the (momentary) voltage dip may be interchangeably used.

Figure 1A:
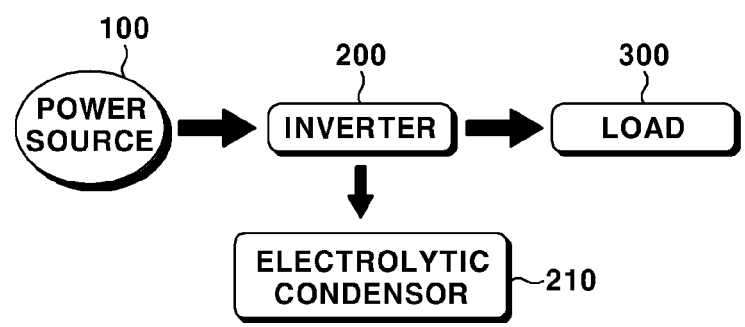
FIGS. 1a and 1b are schematic views illustrating a method for voltage dip compensation in a conventional inverter.
Figure 1B:
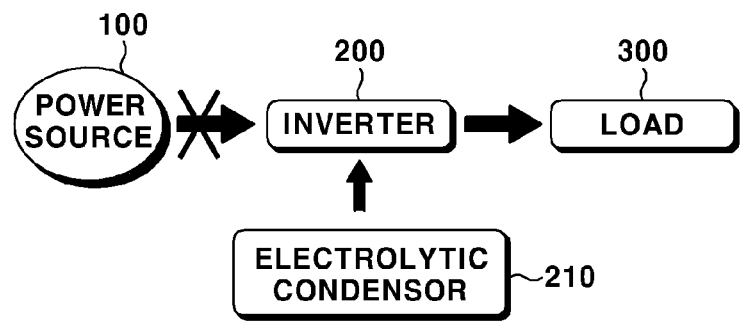
Figure 2:
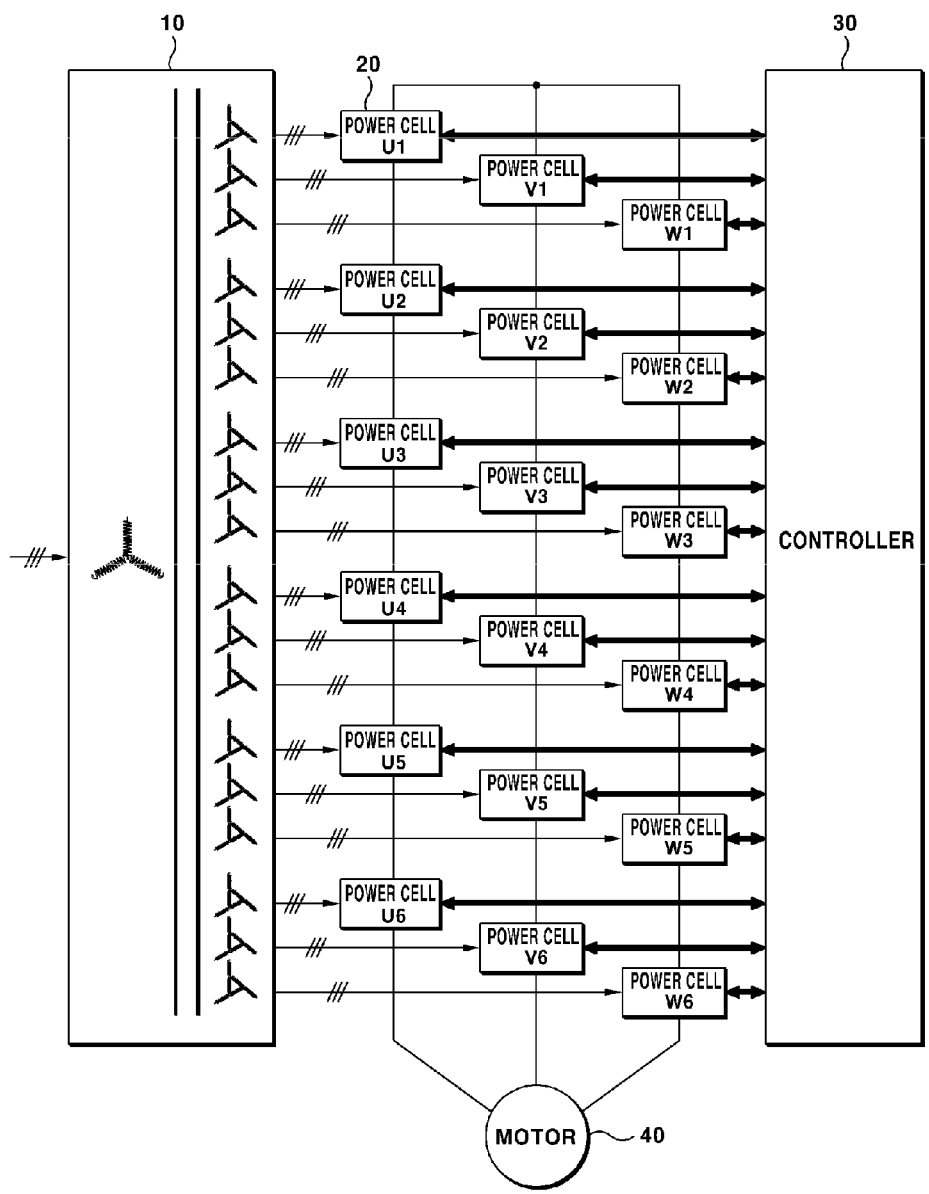
FIG. 2 is a schematic view illustrating a medium voltage inverter system according to an exemplary embodiment of the present disclosure.

FIG. 2 is a schematic view illustrating a medium voltage inverter system according to an exemplary embodiment of the present disclosure.

Referring to FIG. 2, the medium voltage inverter system according to an exemplary embodiment of the present disclosure may include a phase shift transformer (10), a power cell (20), a controller (30) and an electric motor (40).

The phase shift transformer (10) may shift a phase of an input power and supply the shifted phase to a plurality of power cells (20). The controller (30) may be connected to the plurality of power cells (20) through a network where a type of network may be preferably a CAN (Controller Area Network). However, the present disclosure is not limited thereto. The controller (30) may control the power cells (200 through a communication with the power cells (20) and perform the (momentary) voltage dip compensation according to the present disclosure.

Each of the power cells (20) may be a single phase inverter, and form a single phase voltage supplied to the motor (40) by being serially connected, and an entire of the power cells (20) may form a 3-phase inverter capable of obtaining a high voltage output.

Although the exemplary embodiment of the present disclosure has explained and illustrated 18 power cells (20), each of a single phase inverter, it should be apparent to the skilled in the art that the present disclosure is not limited thereto and more power can be supplied to the motor (40) with an increased number of power cells (20).

Furthermore, the power cell (20) may communicate with the controller (30) through a network, and perform the momentary voltage dip compensation in response to control of the controller (30). To this end, the power cell (20) may include thereinside a power cell controller configured to communicate with the controller (30). Hereinafter, a detailed description of the power cells will be made with reference to the accompanying drawings.

Figure 3:
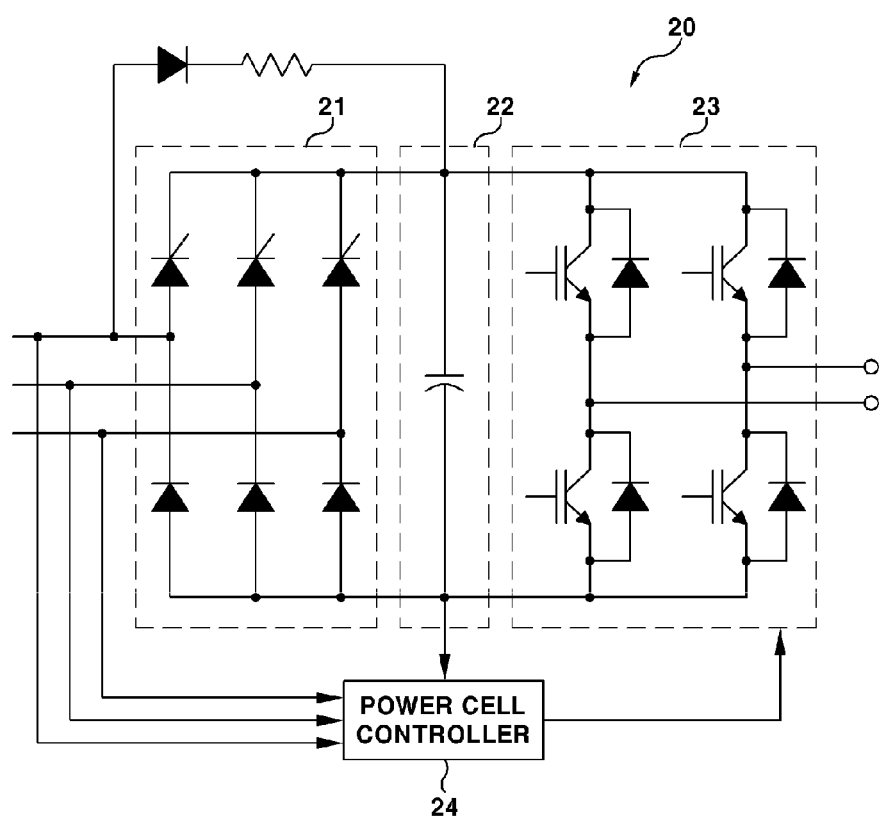
FIG. 3 is a detailed view of power cells in FIG. 2 according to an exemplary embodiment of the present disclosure.

FIG. 3 is a detailed view of power cells in FIG. 2 according to an exemplary embodiment of the present disclosure, where each power cell (20) is same in terms of configuration.

Referring to FIG. 3, the power cell (20) according to the present disclosure may include The rectifier (21) may convert a 3-phase AC (Alternating Current) input voltage to a DC (Direct Current), and the DC-link unit (22) may store a voltage converted to DC by the rectifier (21). Furthermore, the DC-link unit (22) may convert a rectified waveform to a stable DC through a smoothing capacitor.

The inverter unit (23) may generate an AC by switching the rectified DC using a transistor to drive the motor (40). The inverter unit (23) may perform the switching in response to an output frequency of the power cell controller (24), where the transistor of the inverter unit (23) may be an IGBT (Insulated Gate Bipolar Transistor), for example.

The power cell controller (24) may transmit a voltage of the DC-link unit (22) to the controller (30), and transmit an output frequency of the inverter unit (23) in response to the control of the controller (30). That is, the output frequency and voltage of the inverter unit (23) can be adjusted by switching control of the controller (30). In other words, the power cell controller (24) functions to transmit a control signal in response to the control of the controller (30).

Figure 4:
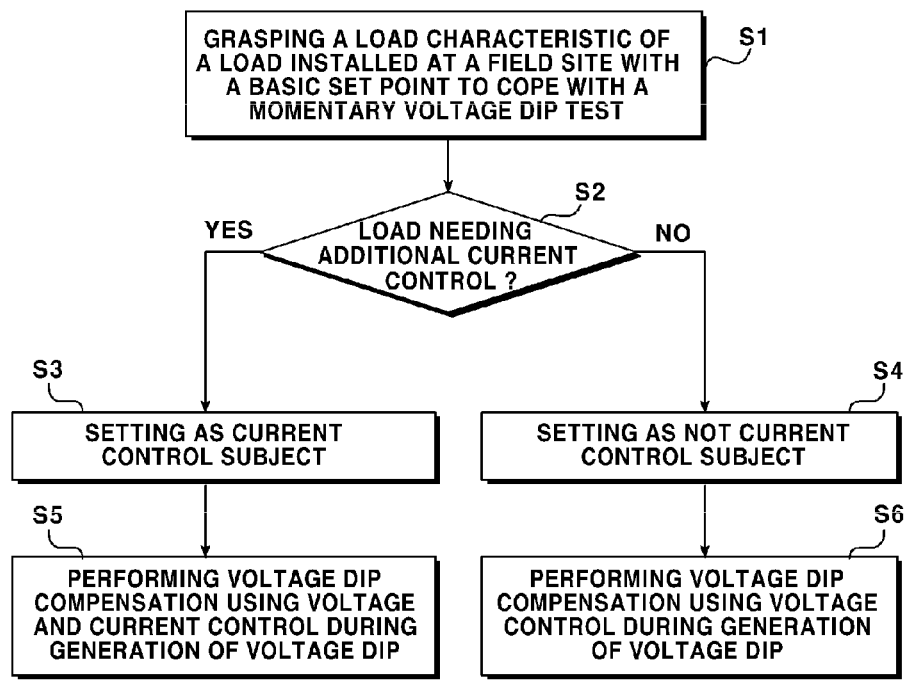
FIG. 4 is a flowchart illustrating a method for voltage dip compensation according to an exemplary embodiment of the present disclosure.

FIG. 4 is a flowchart illustrating a method for voltage dip compensation according to an exemplary embodiment of the present disclosure.

Referring to FIG. 4, the controller (30) may grasp a load characteristic of a load installed at a field site with a basic set point to cope with a momentary voltage dip in response to manipulation of an operator by performing a momentary voltage dip test (S1).

Although a momentary voltage dip compensation for momentary voltage dip was conventionally performed under the assumption that a motor speed drops at a constant level, there is a possibility of generating a situation in an actual industrial site difficult to cope with the momentary voltage dip by controlling a voltage and a current in a medium voltage inverter because each load characteristic and hysteresis characteristic are different. When the problem occurs, a low voltage trip and an over-voltage trip are generated to disable a continuous operation, resulting in a great monetary loss.

In order to prevent the occurrence of the problem, the controller (30) grasps a load characteristic of a load to determine whether to control an output current of a relevant load.

The controller (30) may determine whether a relevant load is a load that requires an additional current control in response to an input of the operator (S2). The controller (30) may perform the determination by receiving a selection signal from the operator as to whether the relevant load is a load that requires an additional current control, if needs be.

No separate current control is made when the load characteristic is same as the normalized load characteristic, and an inverter output frequency is controlled in response to voltage change using a set decelerated gradient while checking the DC-link voltage.

Meantime, separate current control is required when the load characteristic is not same as the normalized load characteristic. In this case, an output current is checked in addition to check of the DC-link voltage, and the inverter output frequency is controlled in response to current change using a set deceleration gradient.

Hence, as a result of determination at S2, when the relevant load is a current control subject, the controller (30) set the relevant load as a current control subject (S3). Meantime, as a result of determination at S3, when it is determined that the relevant load is not a current control subject, the controller (30) may set the relevant load as not a current control subject (S4).

The controller (30) may set to perform a momentary voltage dip compensation using voltage and current control on a relevant inverter when a momentary power failure occurs to a load set as the current control subject during inverter operation (S5).

The controller (30) may control in a manner such that no trip is generated by controlling the voltage and current after power restoration. The controller (30) may prevent an overcurrent from flowing by increasing a voltage by determining a load state at the time of power restoration, and may allow reaching a final target frequency by controlling a voltage.

Meantime, the controller (30) may set to perform a momentary voltage dip compensation using a voltage control of a relevant load without a current control when a momentary power failure occurs during inverter operation for a load set as not a current control subject (S6).

Figure 5:
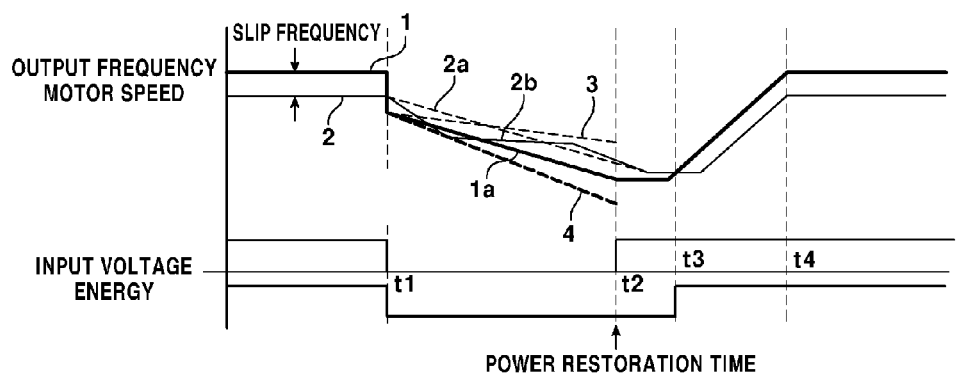
FIG. 5 is a graph illustrating a method for voltage dip compensation according to an exemplary embodiment of the present disclosure.

The method for (momentary) voltage dip compensation by the controller (30) may be further clarified with reference to the following graph of FIG. 5.

FIG. 5 is a graph illustrating a method for voltage dip compensation according to an exemplary embodiment of the present disclosure, where FIG. 5 illustrates an output frequency at the time of power failure, motor speed, input voltage and motor power.

Referring to FIG. 5, an input voltage is inputted up to t1 while maintaining a constant value. Generally, the input voltage is AC (Alternating Current), FIG. 5 illustrates an effective value. A difference between an output frequency (2) and a motor speed (2) of the inverter unit (23) under a normal state is called "a slip frequency".

When the input voltage is reduced below a reference value at t1, the controller (30) may determine that it is a power failure to reduce an output frequency as much as a predetermined value in order to regenerate the power.

Thereafter, the controller (30) may reduce the output voltage using a predetermined deceleration gradient up to t2 which is a power regeneration point. The reduced output frequency is continuously carried out until t2 which is a power restoration point. At this time, there may be a possibility of generating a over-voltage trip (4) or a low voltage trip (3) instead of normal operation when a regeneration amount is great, or the regeneration amount is insufficient in response to reduced time of output frequency set by the controller (30). Thus, it is necessary to adequately reduce an output frequency in order to prevent the over-voltage trip (4) or the low voltage trip (3).

To this end, the output frequency control by the controller (30) may be realized in correspondence to a load characteristic. That is, when the load characteristic is same as the normalized load characteristic (2a), no separate current control is made and the inverter output frequency is controlled in response to voltage change using a set deceleration gradient while checking the DC-link voltage.

Meantime, when the load characteristic is not same as the normalized load characteristic (2b), a separate current control is required. In this case, the output current is checked in addition to the check of the DC-link voltage and the inverter output frequency is controlled in response to current change using the set deceleration gradient.

When input voltage is restored at t2 and the power restoration is realized, an output frequency at the time of power restoration is maintained for a predetermined time (from t2 to t3). The output frequency is made to increase using a set acceleration gradient at t3 when the predetermined time has lapsed, and returns to a state before the power failure at t4. Successively, it can be noted that the output frequency is maintained constantly.

At this time, the t2 time is a point where the output frequency of the inverter unit (23) equals to an actual speed of the motor (40). That is, the time of maintaining the output frequency is preferably set after a time when the output frequency of the inverter unit (23) equals to the actual speed of the motor (40), which is explained in an energy aspect.

When a momentary voltage dip starts at t1, energy of motor (40) may be regenerated toward an inverter side, and therefore energy reduction is realized. At this time, when the regenerative energy increases, an over-voltage trip may be generated and therefore, it is necessary to reduce a V/F (Voltage to Frequency) ratio. When the power is restored at t2, the energy is restricted up to t2 because the input voltage and the regenerative energy are simultaneously supplied to the inverter unit (23) up to t2.

Next, an inverter operation frequency is reduced using a load-adequate inputted deceleration gradient. However, when the DC-link voltage increases due to great regenerative amount in response to the load characteristic, a decreased operation frequency command is made to increase as much as a voltage increment to consume the energy a little. When the input voltage increases to return to power restoration and to deviate from the power failure section, the inverter performs a normal operation, and returns to an existing speed command.

However, a particular load may have a relatively great inertia to generate an over-current trip due to excessive enlargement of slip during power restoration. At this time, return may be made to a normal operation state by continuously putting a time of stopping the acceleration to prevent the inverter from passing an over-current limit using a power restoration mode. Thereafter, the inverter may return to a state prior to the power failure. Furthermore, the controller (30) may continuously sense the voltage and current to perform a voltage and current control lest an over-voltage trip or an over-current trip should be generated.

Figure 6:
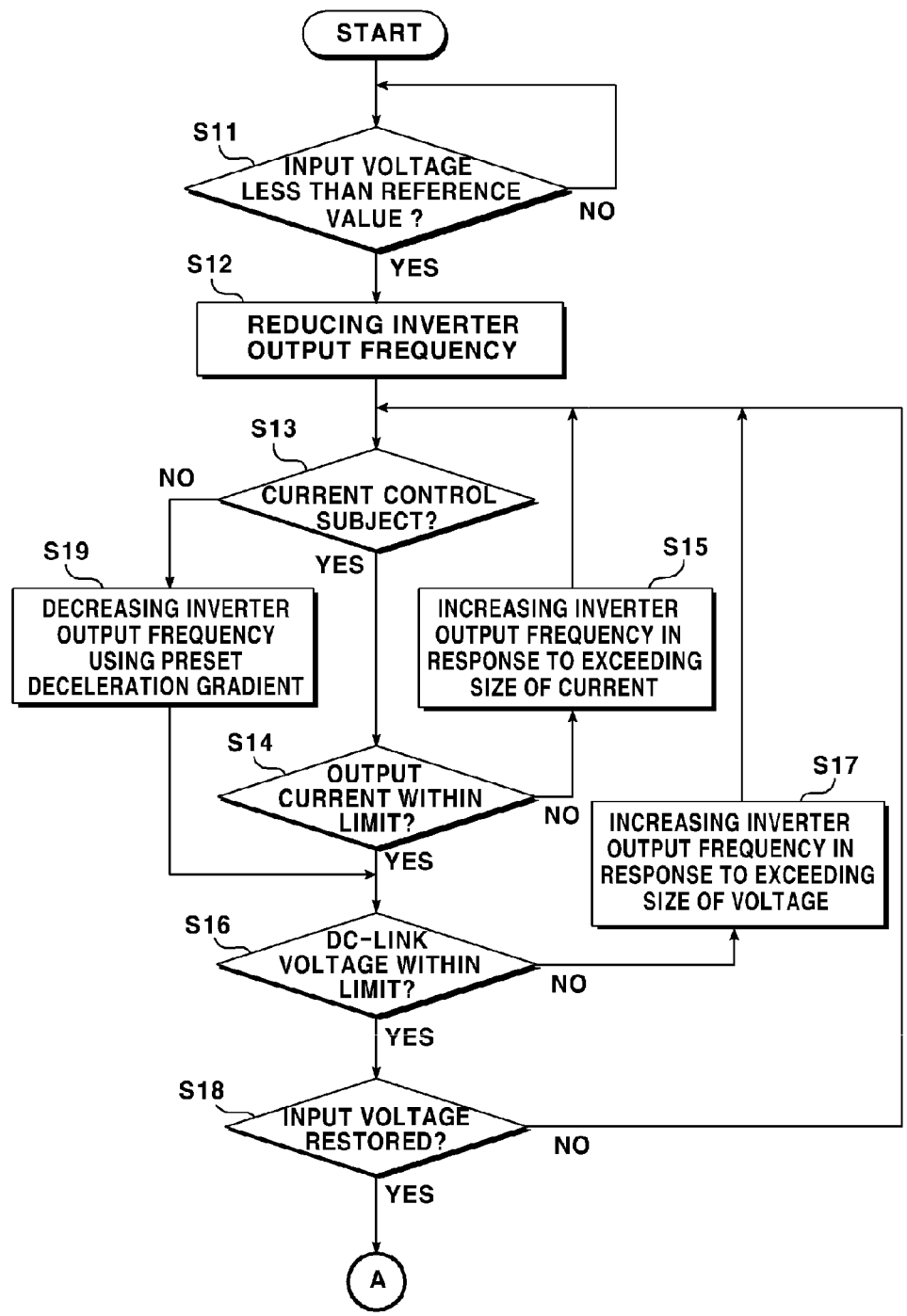
FIGS. 6 and 7 are flowcharts illustrating a method for voltage dip compensation in a medium voltage inverter according to an exemplary embodiment of the present disclosure.
Figure 7:
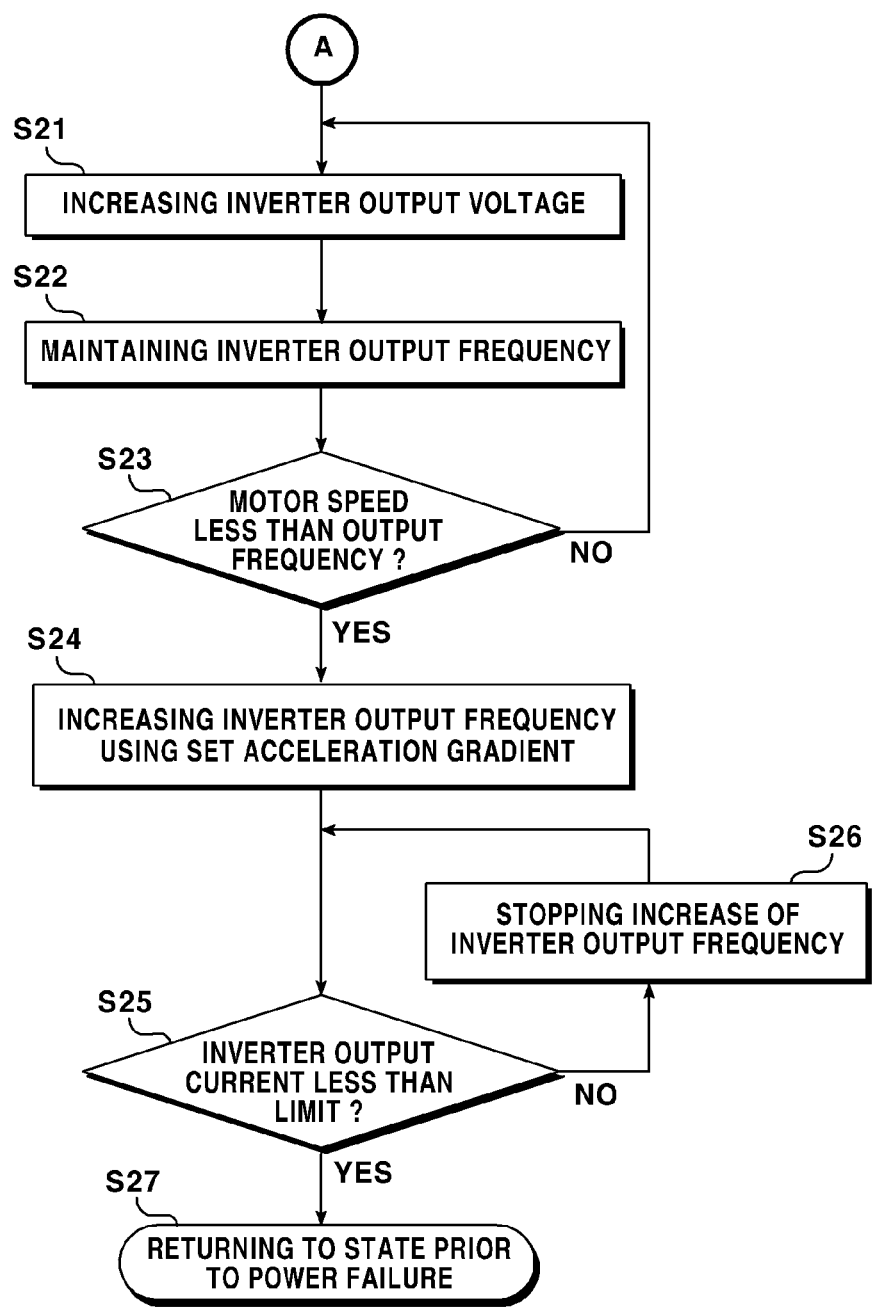

FIGS. 6 and 7 are flowcharts illustrating a method for voltage dip compensation in a medium voltage inverter according to an exemplary embodiment of the present disclosure, which is performed, as explained in the foregoing, by the controller (30) of FIG. 3.

Referring to FIG. 6, the power cell controller (24) may check an input voltage inputted to the power cell (20) to determine whether a relevant input voltage is less than a reference value (S11). When it is determined as a result of determination at S11 that the relevant input voltage is less than a reference value, the power cell controller (24) may determine it as power failure and notify to the controller (30).

An inverter instantly stops when the above situation occurs in the conventional medium voltage inverter, which is due to the fact that capacity of the motor (40), which is a load, is greater than that of capacitor of DC-link unit (22) of power cell (20) to generate a low-voltage trip prior to operation of control loop.

The controller (30) may reduce an output frequency of an inverter unit (23) to start a regenerative process when it is determined that a power is inputted less than a reference value, i.e., when power failure occurs, in order to prevent the low voltage trip (S12), whereby a regenerative energy can be obtained capable of controlling a power failure section at an initial power failure time by reduced output frequency.

The controller (30) may determine whether a relevant load is set as a current control subject (S13). When it is determined as a result of S13 that the relevant load is set as a current control subject, the controller (30) may determine whether an output current of the inverter is within a limit for current control (S14).

When it is determined as a result of S14 that the output current of the inverter is not within a limit for current control, the controller (30) may increase the inverter output frequency in correspondence to an exceeded size of current (S15).

When it is determined as a result of S14 that the output current of the inverter is within a limit for current control, the controller (30) may determine whether the DC-link voltage is within a limit for voltage control (S16). To this end, the power cell controller (24) may keep checking the voltage of DC-link unit (22) and transmit a checked result to the controller (30), which is to prevent an over-voltage trip from occurring.

When it is determined as a result of S16 that the DC-link voltage is not within a limit, that is, when the regenerative amount is great to increase the voltage of the DC-link unit (22), the controller (30) may increase the inverter output frequency in response to size of exceeding voltage based on oversized voltage to increase the decreased output frequency as much as voltage increment and to consume the energy (S17).

Meantime, when it is determined as a result of S13 that the relevant load is not set as a current control subject, the controller (30) may decrease the output frequency of the inverter unit (23) using a predetermined deceleration gradient adequate to a load (motor 40) in order to perform the voltage control alone without current control (S19). At this time, the output frequency is preferably reduced to be smaller than an actual speed of the motor (40).

Thereafter, because the speed of the motor (40) is smaller than the output frequency outputted from the inverter unit (23) by as much as a slip frequency, the speed of motor (40) is also reduced in proportion to a gradient in which the output frequency of the inverter unit (23) is decelerated.

Meantime, when it is determined as a result of S16 that the DC-link voltage is within a limit, the controller (30) may determine whether the input voltage is restored by increased input voltage (S18).

When it is determined as a result of S16 that the input voltage is not restored, steps of S13 to S17 and step of S19 are performed. When it is determined as a result of S16 that the input voltage is restored, there may be generated an overvoltage trip due to sudden excessive voltage by instant power restoration, or an over-current trip due to flow of excessive sudden current. Thus, it is necessary for the controller (30) to control the current and voltage during the power restoration and to prevent the trip from occurring.

Now, referring to FIG. 7, when it is determined as a result of S18 that the input voltage is restored, the controller (30) may prevent the excessive current flow by increasing the inverter output voltage (S21). The controller (30) may maintain the inverter output frequency for a predetermined time in a state where an excessive current is prevented from flowing by increasing the inverter output voltage (S22), which is to prevent the occurrence of over-current trip due to excessive enlargement of slip during power restoration where the motor (40) has a great inertia.

That is, the controller (30) may maintain the output frequency of the power restoration for a predetermined time lest the inverter should exceed an over-current limit at a power restoration mode. The time for maintaining the output frequency is preferably predetermined in response to load amount of the motor (40).

The controller (30) may determine whether the speed of the motor (40) is less than the inverter output frequency (S23). When it is determined as a result of S23 that the speed of the motor (40) is less than the inverter output frequency, the controller (30) may increase the inverter output frequency to a set acceleration gradient to allow the motor (40) to return to a speed prior to the momentary voltage dip (S24), where the acceleration gradient is preset by a user.

At this time, the controller (30) may determine whether the inverter output current is within an over-current limit by continuously monitoring the inverter output frequency (S25).

When it is determined as a result of S25 that the inverter output current is not within an over-current limit, the controller (30) may stops the increase of the inverter output frequency (S26), whereby the speed of the motor (40) may increase to a gradient equal to an acceleration gradient of the output frequency in a state where the inverter output current does not exceed the over-current limit, and may return to a speed prior to the voltage dip (S27).

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims

INDUSTRIAL APPLICABILITY

The exemplary embodiments of the present disclosure have industrial applicability in that a continuous operation is enabled by preventing generation of low voltage trip and overvoltage trip through enablement of adequate countermeasure to where load characteristics are respectively different and hysteresis characteristics are different in actual industrial sites by adjusting an inverter output frequency while an inverter output current and a DC-link voltage are kept within a limited scope at the time of (momentary) voltage dip, and an over-current trip due to excessive generation of slip can be prevented at the time of power restoration by maintaining an inverter output frequency for a predetermined time in a state where an excessive current does not flow by increasing an inverter output voltage while preventing an excessive current from flowing by increasing the inverter output voltage when an input voltage is restored.

What is claimed is:

1. A method for voltage dip compensation of inverter, the method comprising:
    performing a momentary voltage dip test for grasping a load characteristic of a load installed at a field site with a basic set point to cope with a momentary voltage dip;
    determining whether a relevant load is a load that requires an additional current control in response to the grasped load characteristic;
    setting the relevant load as a current control subject when it is determined that the relevant load is the current control subject as a result of determination, and setting the relevant load as not a current control subject when it is determined that the relevant load is not the current control subject as a result of determination;
    setting to perform a momentary voltage dip compensation using voltage and current control on a relevant inverter when a momentary power failure occurs to a load set as the current control subject during inverter operation;
    reducing an output frequency of an inverter to obtain a regenerative energy when it is determined that power failure has occurred during the inverter operation;
    adjusting increase/decrease of inverter output frequency in response to size of exceeding current and voltage based on an output current and DC-link voltage of the inverter;
    increasing the inverter output frequency in order to prevent excessive current flow when power restoration occurs at a power failure state; and
    returning to a speed prior to the momentary voltage dip by gradually increasing the inverter output frequency in a state where the inverter output frequency does not exceed an over-current limit by monitoring the inverter output frequency.

2. The method of claim 1, wherein the step of determining whether the relevant load is a load that requires an additional current control in response to the grasped load characteristic further includes determining that a current control is additionally required when the load characteristic is not equal to a normalized load characteristic.

3. The method of claim 1, wherein the step of setting to perform the momentary voltage dip compensation includes setting to perform a momentary voltage dip compensation by controlling the inverter output frequency in response to current change using a set deceleration gradient while checking an output current in addition to checking a DC-link voltage of a load set for the current control subject when a power failure occurs.

4. The method of claim 1, wherein the step of setting to perform a momentary voltage dip compensation includes setting to perform a momentary voltage dip compensation by controlling the inverter output frequency in response to voltage change using a set deceleration gradient while checking a DC-link voltage of a load not set for the current control subject when a power failure occurs.

5. The method of claim 1, wherein the step of adjusting increase/decrease of inverter output frequency includes controlling adjustment of increase/decrease of the inverter output frequency for momentary voltage dip compensation in response to an output current change and DC-link voltage change using a set deceleration gradient while checking an inverter output current and DC-link voltage.

6. The method of claim 1, wherein the step of adjusting increase/decrease of inverter output frequency includes controlling adjustment of increase/decrease of the inverter output frequency for momentary voltage dip compensation in response to a voltage change using a set deceleration gradient while checking a DC-link voltage of the inverter.

7. The method of claim 1, wherein the step of returning to the speed prior to the momentary voltage dip includes maintaining an output frequency at the time of power restoration for a predetermined time lest the inverter output current should exceed a predetermined over-current limit.

8. The method of claim 7, wherein a time for maintaining the output frequency is set by being determined in advance in response to a load amount of the load.

9. The method of claim 7, wherein a time for maintaining the output frequency is determined to maintain an output frequency so that a load speed becomes smaller than an output frequency of the inverter.

* * * * *